Aug. 29, 1944.  J. B. WHITTED  2,357,152
ELECTRIC WIND SHIELD WIPER
Filed April 2, 1941   3 Sheets-Sheet 1
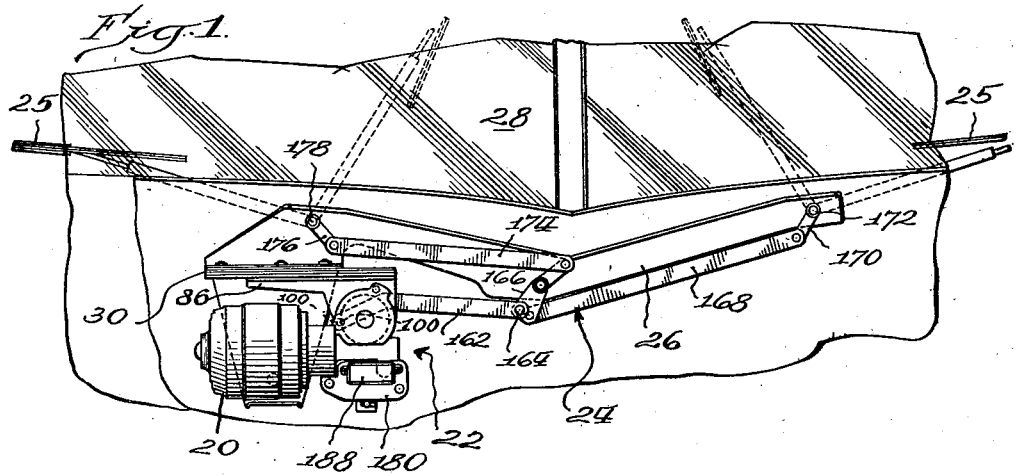
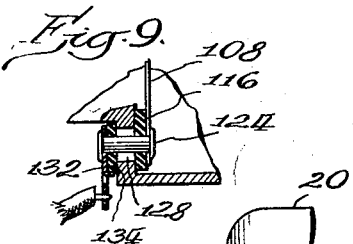
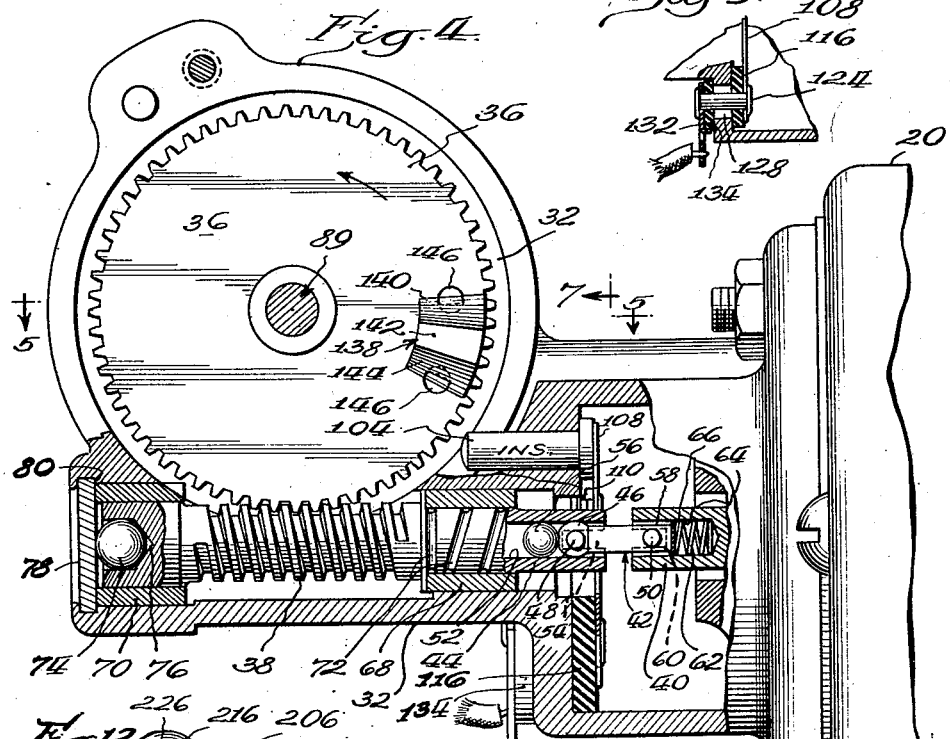
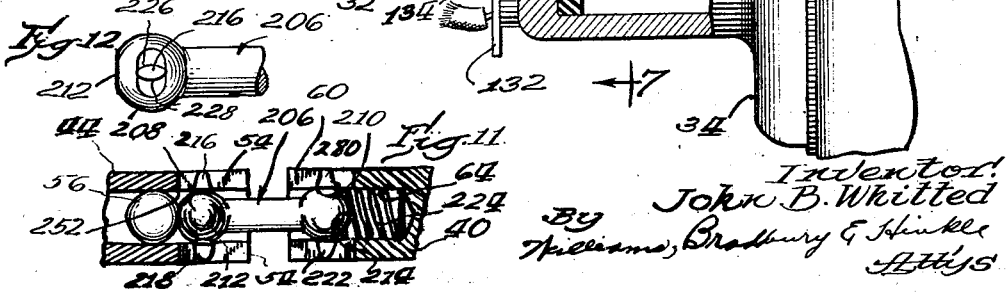
Inventor!
John B. Whitted
By Williams, Bradbury & Hinkle
Attys

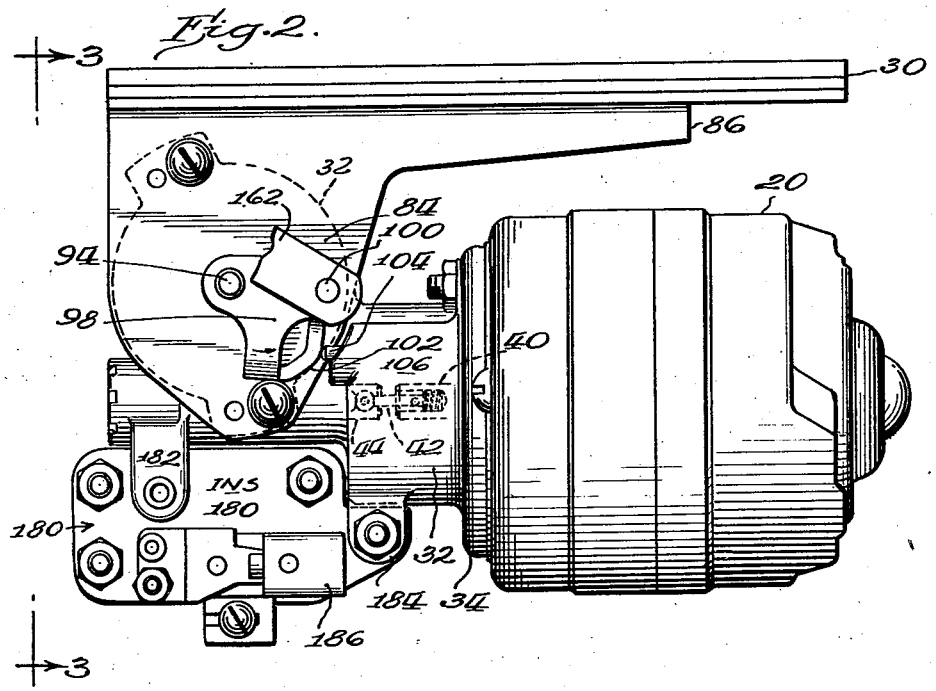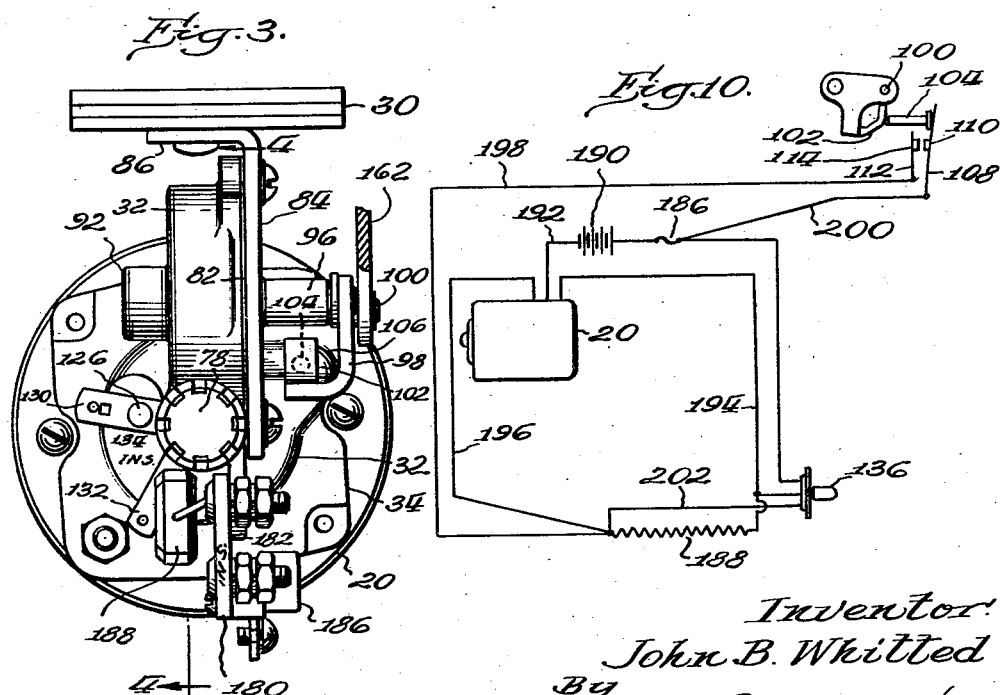

Aug. 29, 1944. J. B. WHITTED 2,357,152
ELECTRIC WIND SHIELD WIPER
Filed April 2, 1941 3 Sheets-Sheet 3
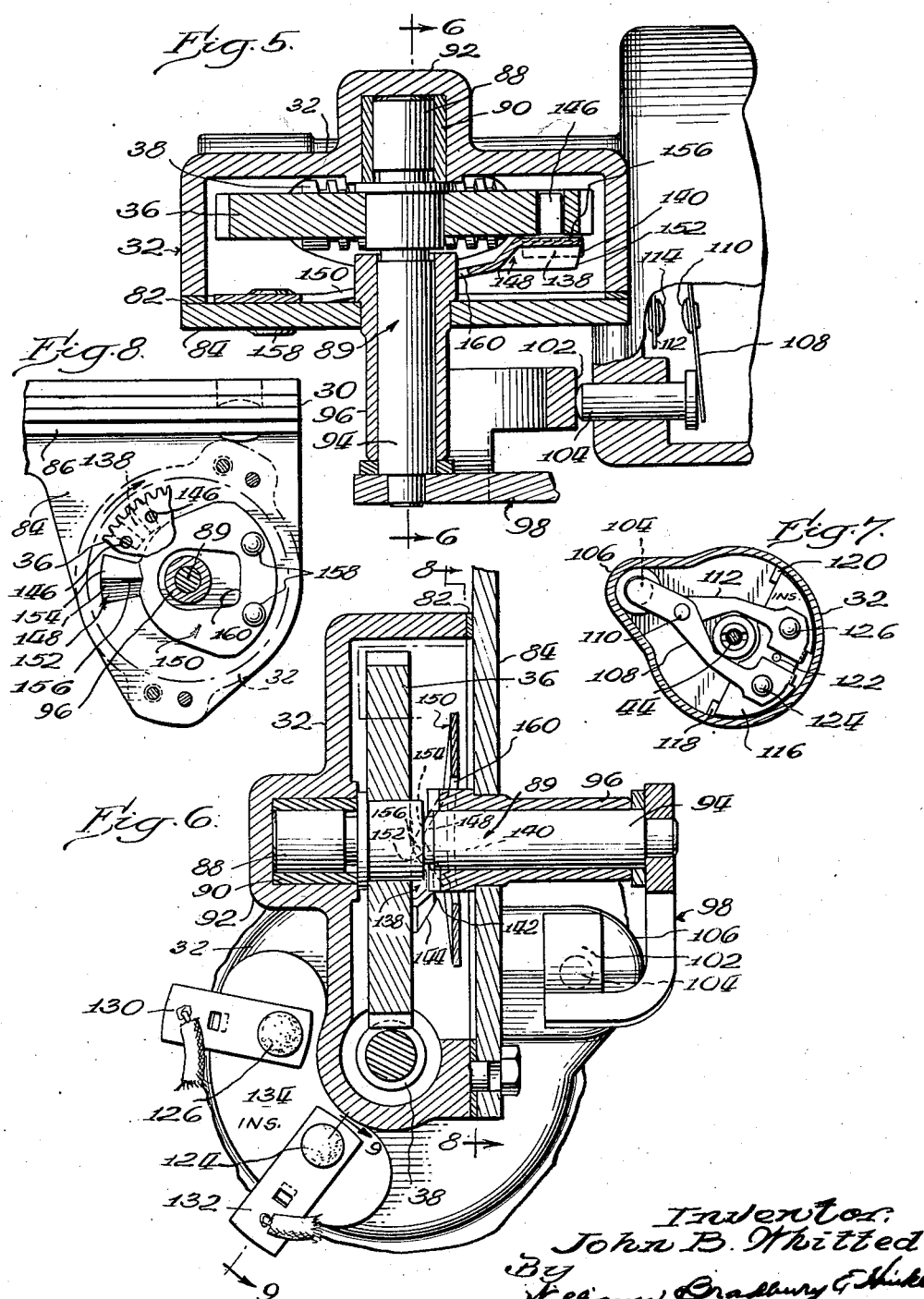

Patented Aug. 29, 1944

2,357,152

UNITED STATES PATENT OFFICE 2,357,152

ELECTRIC WINDSHIELD WIPER

John B. Whitted, Glencoe, Ill., assignor to Stewart-Warner Corporation, Chicago, Ill., a corporation of Virginia Application April 2, 1941, Serial No. 386,490

11 Claims. (Cl. 15—253)

My invention relates generally to electrical windshield wipers and more particularly to electrical windshield wipers of the kind commonly used on automobiles.

When an electric windshield wiper is turned off, it is essential that the wiper blades automatically come to rest in a predetermined parked position out of the line of the operator's vision. In addition, it is desirable that a windshield wiper be constructed as simply and economically as possible in order to minimize its cost either as original equipment or as a replacement part for automobiles.

It is an object of my invention to provide an electric windshield wiper which stops the wiper blades automatically in a predetermined position so as not to obstruct the driver's vision.

A further object of my invention is to provide an electric windshield wiper having a small number of moving parts.

Another object is to provide an improved stopping and parking mechanism for electric windshield wipers.

A further object of my invention is to provide an electric windshield wiper which is simple in construction and operation and which is economical to manufacture.

Other objects and advantages of the invention will appear from the follwowing description.

In the drawings:

Fig. 1 is a diagrammatic view showing my invention applied to the windshield of an automobile. The horizontal position of the blades is indicated by full lines while the vertical position is indicated by broken lines;

Fig. 2 is a side elevation of the driving mechanism;

Fig. 3 is an end view of the driving mechanism taken on the line 3—3 of Fig. 2;

Fig. 4 is a generally vertical section taken on the line 4—4 of Fig. 3;

Fig. 5 is a sectional view taken on the line 5—5 of Fig. 4;

Fig. 6 is a vertical section taken on the line 6—6 of Fig. 5;

Fig. 7 is a transverse section taken on the line 7—7 of Fig. 4;

Fig. 8 is an irregular transverse section taken on the line 8—8 of Fig. 6;

Fig. 9 is a detailed sectional view taken on the line 9—9 of Fig. 6;

Fig. 10 is a wiring diagram;

Fig. 11 is a sectional view of a modification of the coupling member shown in Fig. 4; and Fig. 12 is a plan view of one end of the coupling member shown in Fig. 11.

Referring to Fig. 1, the motor 20, the driving mechanism 22, and the linkage 24 for the wiper blades 25 are mounted upon a support 26 located beneath the cowling of the automobile, and below the windshield 28. Vibration created by the motor and other moving parts is dampened by means of a rubber cushion 30.

The driving mechanism, as in Fig. 4, is encased in a compound housing 32 having a flange 34 to which is attached the motor 20. Within this housing is a worm wheel 36 turned by a worm gear 38 which is coupled to the armature shaft 40 of the motor.

Armature shafts in inexpensive motors of the type used in electric windshield wipers are seldom uniform in length. To compensate for this variation I employ a novel coupling 42 to join the armature shaft 40 and the worm gear shaft 44. This coupling 42 has at one end thereof a ball 46 through which extends a pin 48, and has at the other end thereof a pin 50 alone. The worm gear shaft 44 is provided with an axial bore 52 and opposed axial slots 54 in which are movably mounted respectively the aforementioned ball 46 and pin 48. A second ball 56 which is press-fitted into the bore 52 of the worm gear shaft serves as a bearing surface for the ball 46 and thus prevents the pin 48 from touching the inner ends of the slots 54.

The armature shaft 40 is likewise bored to accommodate the other end 58 of the coupling 42 and is provided with slots 60 which carry the pin 50. A spring 62 in the bore 64 of the armature shaft urges a washer 66 against the end 58 of the coupling 42 thus holding the coupling securely in place and taking up any end play that may be present due to variation in the length of the armature shaft.

From the foregoing description it may be seen that the coupling 42 not only compensates for differences in the length of the armature shaft but also serves as a universal joint, and so makes it unnecessary for the motor and the worm gear to be in precise axial alignment.

The worm gear shaft 44 is journaled in bushings 68, 70 and is provided with grease return grooves 72 which prevent the escape of lubricant from the gear housing. The axial thrust of the worm gear is exerted in the direction of a ball 74 which is press-fitted into the other bored end 76 of the worm gear shaft and which protrudes slightly therefrom. The ball 74 gears against a thrust plate 78 which is securely staked into place against an annular shoulder 80.

That portion of the housing 32 which contains the worm wheel 36 is sealed by means of a gasket 82 and a cover plate 84. This cover plate is extended to serve as a mounting 86 for the entire driving mechanism, and is attached through the rubber cushion 30 to the support 26 (see Fig. 2). One end 88 of the worm wheel shaft 89 is journaled in a short bushing 90 which is pressed into an extension 92 of the housing 32. The extending portion 94 of the worm wheel shaft is journaled in an elongated bushing 96 which protrudes through the cover plate 84 and which is firmly attached thereto by pressing.

A combined cranking and camming member 98 is pressed upon and riveted to the extending end 94 of the worm wheel shaft 89. This combination member includes both a crank pin 100 which is linked to the windshield wiper blades, and a camming surface 102 which actuates an insulated button-shaped cam follower 104.

The cam follower 104 which is part of an electrical make and break system for the motor 20 extends through a hump 106 in the housing 32 and is held in place by a spring arm 108. The reciprocating motion of the cam follower is transmitted to the spring arm 108 which has a contact 110 riveted thereon. A second spring arm 112 has a contact 114 which co-operates with the contact 110 to make or break the motor circuit when the spring arm 108 is flexed by the cam follower 104. Both spring arms are dog-leg shaped in order to provide clearance for the worm gear shaft 44, and are riveted to a semicircular fibre insulator 116 positioned within the housing by means of bosses 118, 120, 122 (see Fig. 7). The rivets 124, 126 which hold the spring arms extend through enlarged holes 128 in the housing and are staked and soldered to contacts 130, 132 mounted on a second fibre insulator 134 on the outside of the housing. This method of mounting the parts of the make and break system prevents them from being grounded by the housing 32 (See Fig. 9).

The motor circuit established by the contacts 110, 114 of the make and break system is in parallel with the principal motor circuit which is controlled by a manual switch 136 (see Fig. 10). Therefore, when a circuit to the motor 20 is established by the manual switch, the motor will operate whether or not current passes through the make and break system. It follows that if the circuit is broken by the manual switch, the motor will continue to operate until the contacts 110, 114 are separated by the cam follower 104. If a two speed manual switch is used in connection with my windshield wiper, it is advisable to connect the contacts 110, 114 with the low speed circuit in order to diminish the speed of the motor before stopping it. This will assure proper operation of my novel braking mechanism.

This braking mechanism comprises in part a braking cam 138 constructed of sheet metal or similar material and having a braking incline 140, a flat dwell 142 at the top thereof, and a reverse slope 144. The braking cam 138 is pressed into holes 146 in the side of the worm wheel 36 adjacent its circumference.

A brake shoe 148 in the form of a stationary V-shaped camming member comprises the other part of the braking mechanism. The brake shoe 148 which is formed integral with a leaf spring 150 has both a braking surface 152 which is shaped complementary to the incline 140 of the braking cam 138, and a reverse incline 154 which is shaped complementary to the reverse slope 144 of the braking cam 138. These surfaces 152, 154 meet at an apex 156.

The leaf spring 150 which carries the brake shoe 148 is affixed by means of rivets 158 to the inner side of the cover plate 84 and is centrally apertured 160 in order that the shaft 89 of the worm wheel 36 may pass therethrough.

The braking cam 138 and the brake shoe 148 are relatively positioned so that, with each revolution of the worm wheel 36, the braking incline 140 of the braking cam 138 will meet the braking surface 152 of the brake shoe. When the motor 20 is running, it has sufficient power to flex the leaf spring 150 and cause the braking cam 138 to override the brake shoe 148. On the other hand, when the current to the motor 20 is cut off, the leaf spring 150 is sufficiently rigid to hold the brake shoe 148 against the slowly moving braking cam 138 so that the braking surface 152 of the brake shoe bears against the braking incline 140 thereby stopping the entire wiper mechanism in its parked position. Most of the braking effort is exerted by the brake shoe 148 during the time that the apex 156 is on the incline side of the braking cam 138, although some braking effort may be exerted by the contact of the apex 156 with the flat dwell 142 of the braking cam should the worm wheel 36 occasionally move to that position before stopping.

Parking the wiper blades in a predetermined position is dependent upon the relative arrangement of the operative parts of the entire windshield wiper assembly. It is necessary, therefore, to locate the braking cam 138 at a point on the worm wheel 36 which will permit the braking cam and the brake shoe 148 to meet momentarily after the circuit to the motor 20 is broken by the action of the camming surface 102 upon the cam follower 104 with the resulting separation of the contacts 110, 114 (the circuit through the manual switch 136 having been broken previously). The crank pin 100 to which is linked the wiper blades 25, must be similarly positioned in relation to the braking mechanism and the make and break contacts 110, 114 so that the wiper blades will be in a parked position when the motor and its associated parts are brought to a stop by the action of the brake.

Communication between the crank pin 100 and the wiper blades 25 is established by a dog-leg shaped link 162 which joins the crank pin to a pin 164 on the lower end of a walking beam 166 which is mounted on the support 26. The reciprocating movement of the walking beam 166 is transmitted by a link 168 to an arm 170 of the wiper blade shaft 172. Similarly, another link 174 joins the walking beam 166 to an arm 176 of the other wiper blade shaft 178.

A terminal block 180, as in Fig. 2, is secured to bosses 182, 184 which are cast integral with the housing 32. Mounted on the terminal block is an automatic circuit breaker 186 of the type which re-establishes the circuit after a cooling period. A resistor 188 is mounted on the side of the terminal block 180 opposite the circuit breaker 186.

Referring to Fig. 10, the speed of the motor 20 is controlled by means of the two-speed manual switch 136 which may be mounted on the dashboard of the automobile or at any other convenient location. The motor 20 is connected to a usual automobile battery 190 by means of a conductor 192. The automatic circuit breaker 186 is shown as interposed between the battery 190 and the manual switch 136. The electric motor 20 has an armature circuit 194 and a field circuit 196.

A parallel low speed circuit through the make and break contacts 110, 114 is established through the conductors 198, 200. In Fig. 10 this parallel circuit is represented as broken, because the camming surface 102 has actuated the cam follower 104 thus causing the contacts 110, 114 to separate.

For high speed operation of the motor, the resistor 188 is interposed in the field circuit by means of the manual switch 136. When it is desired to operate the motor in low speed, a circuit is established through a conductor 202 to the field circuit 196 thus cutting out the resistor 188. It is to be understood, of course, that a high speed circuit is not essential, and my windshield wiper can be operated equally well without it.

A modification of the coupling which links the armature shaft 40 to the worm gear shaft 44 is shown in Fig. 11. This modification consists of a coupling shaft 206, dog-bone in shape, and having generally spherical ends 208, 210, which are slightly flattened 212, 214. The end 208 is provided with protruding ears 216, 218, and the end 210 is provided with similar ears 220, 222. These ears are formed preferably by a simple pinching or pressing operation. The spherical end 208 fits movably in the bore 52 of the worm gear shaft and the ears 216, 218 rest in the axial slots 54. The ball 56 which is press-fitted into the bore 52 of the worm gear shaft 44 serves as a bearing surface for the slightly flattened spherical end 208 and prevents the ears 216, 218 from touching the inner ends of the slots 54.

The other end 210 of the coupling shaft 206 fits movably in the bore 64 of the armature shaft 40 and the ears 220, 222 rest in the axial slots 60. In this embodiment a spring 224 abuts the slightly flattened end 214 thus holding the coupling securely in place and taking up any end play that may be present due to variation in the length of the armature shaft. In order to make certain that the coupling operates smoothly, the edges 226, 228 of the ears 216, 218 are rounded on the sides which are in contact with the slots. The edges of the ears 220, 222 are likewise rounded. This not only minimizes friction and prevents binding, but also allows the coupling a greater degree of side play and thus enables it to act as a universal joint.

The operation of my windshield wiper and its novel mechanism for parking the wiper blades is as follows: When the manual switch 136 is turned to an "on" position, either high or low, the motor 20 revolves the coupling 42 which in turn revolves the worm gear 38 and the worm wheel 36. The combined cranking and camming member 98 revolves with the worm wheel shaft 89 and turns the crank pin 100 which is linked to the windshield wiper blades 25. The crank pin, through the linkage 24, causes the wiper blades to reciprocate in an arc across the windshield as previously described.

With each revolution of the worm wheel 36, the braking cam 138 and the brake shoe 148 come into contact with each other. As this contact takes place, the wiper blades are in a parked position and the crank pin 100 is at dead center; (see Fig. 1) therefore at the time when the braking members are together, there is scarcely any movement in the linkage 24, and consequently the linkage imposes no appreciable load upon the motor 20. As a result, most of the motive power is available to cause the braking members to override one another.

With each revolution of the worm wheel shaft 89, the camming surface 102 actuates the insulated cam follower 104, thus flexing the spring arm 108 and separating the contacts 110, 114. This would break the circuit to the motor 20 were it not for the fact that a parallel circuit through the manual switch 136 has been established.

When the driver desires to turn off the windshield wiper, he simply turns the manual switch 136 to the "off" position. The circuit to the motor through the manual switch is thereby broken, but the motor will continue to operate in low speed until the parallel circuit through the make and break contacts 110, 114 is broken by the contact of the camming surface 102 with the cam follower 104. When this takes place, the current to the motor is completely cut off, and momentarily thereafter the braking incline 140 of the braking cam 138 meets the braking surface 152 of the brake shoe 148. Inasmuch as the motor has ceased to run, the leaf spring 150 will have sufficient rigidity to hold the brake shoe 148 against the braking cam 138 and thereby stop the entire wiper mechanism in its predetermined parked position, as previously described.

It may happen occasionally that the moving parts will have sufficient momentum to carry the flat dwell 142 on the braking cam 138 past the apex 156 of the brake shoe 148, even though the current to the motor 20 is cut off. This situation is most likely to occur in cases where the manual switch is turned from the "high speed position" to the "off" position momentarily before the braking cam meets the brake shoe. Consequently a low speed circuit to the motor 20 is not established in time to diminish sufficiently the speed of the moving parts before the braking takes place; therefore the braking cam and the brake shoe will override one another. Simultaneously with the overriding of the braking members, the camming surface 102 releases the cam follower 104 so that the contact points 110, 114 come together to establish a low speed circuit to the motor 20. Of course, the next operation is at low speed and the moving parts will not have sufficient momentum to carry the braking cam 138 past the brake shoe 148 upon the next revolution of the worm wheel.

It is to be understood that my invention may assume numerous forms and that it is not limited to the details illustrated and described herein.

I claim:

1. An electric windshield wiper for a vehicle having a battery, said wiper having wiper blades, an electric motor for driving said wiper blades, a manual switch for connecting said motor with said battery, a make and break switch operative in a circuit parallel with the circuit controlled by the manual switch, driving mechanism interposed between said motor and said wiper blades, said driving mechanism comprising in combination, a rotatable element driven by said motor, cranking means revolving with the rotatable element, linkage between said cranking means and said wiper blades, a camming member for operating said make and break switch, and braking means to stop the windshield wiper momentarily after said make and break switch has cut off the current to the motor, said braking means comprising a braking cam on said rotatable element, a brake shoe to engage said braking cam and means resilient to urge said brake shoe against said braking cam, said braking cam comprising a braking incline on the portion of the braking cam which first meets the brake shoe, a reverse slope on the side opposite the braking incline, and a flat dwell between said incline and said slope, said brake shoe having opposed surfaces complementary to said braking incline and said reverse slope, said braking means being inoperative to stop the windshield wiper when the motor is under power, but being operative to stop the windshield wiper when the power to the motor is cut off, said braking means being positioned in relation to said cranking means and said camming member to stop the wiper blades in a predetermined location.

2. In an electric windshield wiper for a vehicle having a battery, the combination of wiper blades, an electric motor for driving said wiper blades, a manual switch for connecting said motor with said battery, a make and break switch operative in a circuit parallel with the circuit controlled by the manual switch, driving mechanism interposed between said motor and said wiper blades, said driving mechanism comprising in combination a worm gear driven by said motor, a worm wheel driven by said worm gear, cranking means connecting said driving mechanism with said wiper blades, camming means for operating said make and break switch, and a friction brake to stop the entire windshield wiper assembly momentarily after said make and break switch has cut off the current to the motor, said friction brake comprising a braking cam on said worm wheel, a stationary brake shoe to engage said braking cam, and means resilient to urge said brake shoe against said braking cam, said braking cam comprising a braking incline on the side of the braking cam which first meets the brake shoe, a reverse slope on the side opposite the braking incline, and a flat dwell between said incline and said slope, said brake shoe having a braking surface complementary to said braking incline and a reverse incline complementary to said reverse slope, said friction brake being inoperative to stop the windshield wiper when the motor is under power, but being operative to stop the windshield wiper when the power to the motor is cut off, said friction brake being positioned in relation to said cranking means and said camming member to stop the wiper blades in a predetermined location.

3. An electric windshield wiper for a vehicle having a battery, said wiper having wiper blades, an electric motor for driving said wiper blades, a manual switch for connecting said motor with said battery, a make and break switch operative in a circuit parallel with the circuit controlled by the manual switch, driving mechanism for the wiper blades interposed between said motor and said wiper blades, said driving mechanism comprising a worm gear driven by said motor, a worm wheel driven by the worm gear, a shaft for the worm wheel, a combination member on said shaft, said combination member having camming means for operating said make and break switch and cranking means coupled to said wiper blades, and braking means to stop said worm wheel momentarily after said make and break switch has cut off the current to the motor, said braking means comprising a braking cam on said worm wheel, a stationary brake shoe, and means resilient to urge said brake shoe against said braking cam, said braking means being positioned in relation to said cranking means and said camming means to stop the wiping means in a predetermined location.

4. In an electric windshield wiper, the combination of wiper blades, a motor for driving said blades, driving mechanism interposed between said motor and said blades, said driving mechanism comprising in combination, a worm gear, a worm wheel driven by the worm gear, cranking means revolving with said worm wheel, linkage between said cranking means and said wiper blades, and braking means cooperating with said driving mechanism to stop the wiper blades in a predetermined position, said braking means comprising a braking cam on said worm wheel, a stationary brake shoe, and means to urge said brake shoe against said braking cam with each revolution of said worm wheel, said braking cam comprising a braking incline, a retreating incline, and a flat dwell between said inclines, said brake shoe having opposed surfaces complementary to said inclines of the braking cam, said braking means being inoperative to stop the wiper blades when the motor is under power, but being operative to stop the wiper blades when the power to the motor is cut off.

5. An electric windshield wiper for a vehicle having a battery, said windshield wiper having wiper blades, an electric motor for driving said wiper blades, a manual switch for connecting said motor with said battery, a make and break switch operative in a circuit parallel with the circuit controlled by the manual switch, driving mechanism interposed between said motor and said wiper blades, said driving mechanism comprising in combination a worm gear, a worm wheel driven by said worm gear, a shaft for the worm wheel, a combination member on said shaft, said combination member having camming means for operating said make and break switch and a crank pin coupled to said wiper blades, and braking means positioned in relation to said crank pin and said camming means to stop said wiper blades in a predetermined position, said braking means comprising a braking cam on the side of said worm wheel, a stationary brake shoe, and a leaf spring to urge said brake shoe against said braking cam with each revolution of said worm wheel, said leaf spring having an aperture therein in order that said worm wheel shaft may extend therethrough, said braking cam comprising a braking incline, a retreating incline, and a flat dwell between said inclines, said brake shoe having a braking surface complementary to said braking incline and an opposed reverse incline complementary to said retreating incline, said braking means being inoperative to stop the wiper blades when the motor is under power but being operative to stop the wiper blades when the power to the motor is cut off.

6. An electric windshield wiper of the class described having wiper blades, a motor for driving said blades, driving mechanism interposed between said motor and said blades, said driving mechanism comprising a worm gear having a recess at one end, said end receiving the majority of the thrust exerted by said worm gear, a ball pressed into said recess, a thrust plate providing a bearing surface for said ball, a worm wheel driven by the worm gear, cranking means revolving with said worm wheel, linkage between said cranking means and said wiper blades, and braking means co-operating with said driving mechanism to stop the wiper blades in a predetermined position, said braking means comprising a braking cam on said worm wheel, a stationary brake shoe, and means to urge said brake shoe against said braking cam with each revolution of said worm wheel, said braking cam comprising a braking incline, a retreating incline, and a flat dwell between said inclines, said brake shoe having opposed surfaces complementary to said inclines of the braking cam, said braking means being inoperative to stop the wiper blades when the motor is under power, but being operative to stop the wiper blades when the power to the motor is cut off.

7. In a windshield wiper of the class described, the combination of a wiper blade, a power driven motor for operating said blade, a rotatable element driven by said motor and coupled to the wiper blade to reciprocate it, a stationary hump on said rotatable element, a stationary brake shoe adapted to engage said hump with each revolution of the rotatable element, said brake shoe being inoperative to stop the rotatable element when the motor is under power but being operative to stop the rotatable element when the power to the motor is cut off, said hump and said brake shoe being relatively located to stop the wiper blade in a predetermined position.

8. An electric windshield wiper for a vehicle having a battery, said wiper comprising wiper blades, an electric motor for driving said blades, a manual switch for connecting said motor with said battery, a make and break switch operative in a circuit parallel with the circuit controlled by the manual switch, driving mechanism interposed between said motor and said wiper blades, said driving mechanism comprising in combinaton a rotatable element driven by said motor, cranking means revolving with the rotatable element, linkage between said cranking means and said wiper blades, a camming member for operating said make and break switch, and braking means to engage said rotatable element momentarily after said make and break switch has cut off the current to the motor, said braking means being positioned in relation to said cranking means and said camming member to stop the wiper blades in a predetermined location.

9. In an electric windshield wiper for a vehicle having a battery, the combination of wiper blades, a motor for driving said blades through a given cycle of operation, a manual switch for connecting said motor with said battery, a make and break switch operative in a circuit parallel with the circuit controlled by the manual switch, driving mechanism interposed between said motor and said wiper blades, said driving mechanism comprising a rotatable element driven by said motor, cranking means coupled to said rotatable element, a linkage connecting said cranking means with said wiper blades, a camming member for operating said make and break switch, and a friction brake for stopping said wiper blades momentarily after the circuit between said battery and said motor is broken, said friction brake being positioned in relation to said cranking means and said camming member to stop the wiper blades in a predetermined location, said friction brake being engageable for each cycle of operation of said wiper blades and being operative to stop said wiper blades when the circuit to the motor is broken, but being inoperative to stop said wiper blades when the motor is running.

10. An electric windshield wiper for a vehicle having a battery, said wiper having wiper blades, an electric motor for driving said wiper blades through a given cycle of operation, a manual switch for connecting said motor with said battery, a make and break switch operative in a circuit parallel with the circuit controlled by the manual switch, driving mechanism interposed between said motor and said wiper blades, said driving mechanism comprising in combination a rotatable element driven by said motor, cranking means revolving with said rotatable element, linkage between said cranking means and said wiper blades, a camming member for operating said make and break switch, and braking means to stop said windshield wiper in a predetermined parked position momentarily after said make and break switch has cut off the current to the motor, said braking means being activated for each cycle of operation, but being incapable of overcoming the pull of said motor when the latter is connected to said battery, said braking means being operative when said cranking means is at dead center in conjunction with said wiper blades being in said parked position, said braking means being inoperative when said cranking means is not at dead center in conjunction with said wiper blades not being in said parked position.

11. In an electric windshield wiper of the class described, the combination of a wiper blade, an electric motor for driving said wiper blade through a predetermined cycle of operation, switch means for connecting said electric motor with a source of electrical energy, driving mechanism interposed between said electric motor and said wiper blade, and a friction brake for stopping said wiper blade in a predetermined parked position, said friction brake including a first part movable with said driving mechanism and a relatively stationary second part, said brake parts being engageable for each cycle of movement of said wiper blade, said electric motor exerting sufficient force when connected with said source of electrical energy to overcome the frictional resistance of said brake, said brake being effective to stop said wiper blade in said parked position only when said electrical motor is disconnected from said source of electrical energy.

JOHN B. WHITTED.